(12) United States Patent
Muthu et al.

(10) Patent No.: US 8,102,642 B2
(45) Date of Patent: Jan. 24, 2012

(54) LARGE FORMAT ULTRACAPACITORS AND METHOD OF ASSEMBLY

(75) Inventors: Milburn Ebenezer Jacob Muthu, Breinigsville, PA (US); Henry Meehan, Suffern, NY (US); David Paolazzi, North Arlington, NJ (US); Shanthi Korutla, Morton, PA (US); David K. Whitmer, Center Valley, PA (US)

(73) Assignee: International Battery, Inc., Allentown, PA (US)

( * ) Notice: Subject to any disclaimer, the term of this patent is extended or adjusted under 35 U.S.C. 154(b) by 0 days.

(21) Appl. No.: 12/852,107

(22) Filed: Aug. 6, 2010

(65) Prior Publication Data
US 2011/0141661 A1 Jun. 16, 2011

(51) Int. Cl.
*H01G 9/00* (2006.01)

(52) U.S. Cl. ........ 361/502; 361/503; 361/504; 361/509; 361/512; 361/516

(58) Field of Classification Search ........ 361/502, 361/503–504, 509–512, 523–529, 530–531, 361/516–519
See application file for complete search history.

(56) References Cited

U.S. PATENT DOCUMENTS

| | | | |
|---|---|---|---|
| 3,625,759 A | 12/1971 | Williams | |
| 4,664,883 A | 5/1987 | Melody et al. | |
| 5,150,283 A * | 9/1992 | Yoshida et al. | 361/502 |
| 5,175,222 A | 12/1992 | Betso | |
| 5,514,488 A | 5/1996 | Hake et al. | |
| 5,557,497 A | 9/1996 | Ivanov et al. | |
| 5,707,756 A | 1/1998 | Inoue et al. | |
| 5,795,558 A | 8/1998 | Aoki et al. | |
| 5,866,279 A | 2/1999 | Wada et al. | |
| 5,897,955 A | 4/1999 | Drumheller | |
| 6,007,947 A | 12/1999 | Mayer | |
| 6,031,712 A | 2/2000 | Kurihara et al. | |
| 6,159,636 A | 12/2000 | Wang et al. | |
| 6,183,908 B1 | 2/2001 | Miyasaka et al. | |
| 6,235,427 B1 | 5/2001 | Idota et al. | |
| 6,282,081 B1 | 8/2001 | Takabayashi et al. | |
| 6,372,387 B1 | 4/2002 | Kawakami et al. | |

(Continued)

FOREIGN PATENT DOCUMENTS
EP 573266 A1 12/1993
(Continued)

OTHER PUBLICATIONS

Title: "Effect of pH on the Synthesis of $LiCoO_2$ with Malonic Acid and Its Charge/Discharge Behavior for a Lithium Secondary Battery" Source: Bulletin of the Korean Chemical Society 2000, vol. 21, No. 11 pp. 1125-1132.

*Primary Examiner* — Nguyen T Ha
(74) *Attorney, Agent, or Firm* — Design IP

(57) ABSTRACT

A capacitor includes a plurality of electrode substrates, with each of the plurality of electrode substrates having a coated portion and an uncoated portion. The coated portion is coated with a coating material that includes a high surface area activated carbon material, a water soluble binder selected from the group consisting of: poly vinyl alcohol, poly acrylic acid, polymethacrylic acid, polyethylene oxide, polyacrylamide, poly-N-isopropylearylamide, poly-N,N-dimethylacrylamide, polyethyleneimine, polyoxyethylene, polyvinylsulfonic acid, poly(2-methoxyethoxyethoxyethylene), butadiene-acrylonitrile, and combinations thereof, and a water soluble thickener. A separator is inserted between adjacent substrates of the plurality of electrode substrates. The capacitor further includes an electrolyte. A method of manufacturing the capacitor is also provided.

20 Claims, 3 Drawing Sheets

U.S. PATENT DOCUMENTS

| | | | |
|---|---|---|---|
| 6,399,246 B1 | 6/2002 | Vandayburg et al. | |
| 6,497,979 B1 | 12/2002 | Iijima et al. | |
| 6,602,742 B2 | 8/2003 | Maletin et al. | |
| 6,616,903 B2 | 9/2003 | Poles et al. | |
| 6,627,252 B1 | 9/2003 | Nanjundiah et al. | |
| 6,697,249 B2 | 2/2004 | Maletin et al. | |
| 6,770,397 B1 | 8/2004 | Maeda et al. | |
| 6,811,911 B1 | 11/2004 | Peled et al. | |
| 6,852,449 B2 | 2/2005 | Nagata et al. | |
| 6,881,517 B1 | 4/2005 | Kanzaki et al. | |
| 6,946,007 B2 | 9/2005 | Bendale et al. | |
| 6,955,694 B2 | 10/2005 | Bendale et al. | |
| 6,987,663 B2 | 1/2006 | Merker et al. | |
| 7,027,292 B2 | 4/2006 | Anzai et al. | |
| 7,052,629 B2 | 5/2006 | Maeda et al. | |
| 7,052,803 B2 | 5/2006 | Kato et al. | |
| 7,083,829 B2 | 8/2006 | Hoke et al. | |
| 7,227,737 B2 | 6/2007 | Mitchell et al. | |
| 7,267,907 B2 | 9/2007 | Kim | |
| 7,316,864 B2 | 1/2008 | Nakayama et al. | |
| 7,393,476 B2 | 7/2008 | Shiozaki et al. | |
| 7,419,745 B2 | 9/2008 | Chaturvedi et al. | |
| 7,422,826 B2 | 9/2008 | Xing et al. | |
| 7,425,386 B2 | 9/2008 | Takezawa et al. | |
| 7,481,991 B2 | 1/2009 | Kawasato et al. | |
| 7,508,651 B2 | 3/2009 | Mitchell et al. | |
| 7,531,272 B2 | 5/2009 | Park et al. | |
| 7,547,491 B2 | 6/2009 | Ham et al. | |
| 7,558,050 B2 | 7/2009 | Roh et al. | |
| 7,570,478 B2 | 8/2009 | Terada et al. | |
| 7,749,658 B2 | 7/2010 | Isono et al. | |
| 7,914,704 B2 * | 3/2011 | Yamakawa et al. | 252/500 |
| 2002/0110732 A1 | 8/2002 | Coustier et al. | |
| 2003/0091883 A1 | 5/2003 | Peled et al. | |
| 2003/0118904 A1 | 6/2003 | Hosokawa et al. | |
| 2003/0138696 A1 | 7/2003 | Peres et al. | |
| 2003/0172509 A1 | 9/2003 | Maletin et al. | |
| 2004/0020763 A1 | 2/2004 | Kanzaki et al. | |
| 2004/0023115 A1 | 2/2004 | Kato et al. | |
| 2004/0121232 A1 | 6/2004 | Kato et al. | |
| 2004/0234850 A1 | 11/2004 | Watarai et al. | |
| 2005/0069763 A1 | 3/2005 | Hong et al. | |
| 2005/0074669 A1 | 4/2005 | Park et al. | |
| 2005/0142446 A1 | 6/2005 | Yamamoto et al. | |
| 2005/0238958 A1 | 10/2005 | Kim | |
| 2006/0058462 A1 | 3/2006 | Kim et al. | |
| 2006/0166093 A1 | 7/2006 | Zaghib et al. | |
| 2006/0194116 A1 | 8/2006 | Suzuki et al. | |
| 2006/0228627 A1 | 10/2006 | Nakayama et al. | |
| 2006/0275661 A1 | 12/2006 | Kim et al. | |
| 2007/0055023 A1 | 3/2007 | Han et al. | |
| 2007/0264568 A1 | 11/2007 | Ryu et al. | |
| 2007/0264573 A1 | 11/2007 | Yamada et al. | |
| 2007/0292765 A1 | 12/2007 | Inoue et al. | |
| 2008/0089006 A1 | 4/2008 | Zhong et al. | |
| 2008/0090138 A1 | 4/2008 | Vu et al. | |
| 2008/0118834 A1 | 5/2008 | Yew et al. | |
| 2008/0118840 A1 | 5/2008 | Yew et al. | |
| 2008/0160415 A1 | 7/2008 | Wakita et al. | |
| 2008/0212260 A1 | 9/2008 | Roh et al. | |
| 2008/0254362 A1 | 10/2008 | Raffaelle et al. | |
| 2008/0299461 A1 | 12/2008 | Kim | |
| 2009/0080141 A1 | 3/2009 | Eilertsen | |
| 2009/0148772 A1 | 6/2009 | Kawasato et al. | |
| 2009/0155694 A1 | 6/2009 | Park | |
| 2009/0214952 A1 | 8/2009 | Wakita et al. | |
| 2009/0220678 A1 | 9/2009 | Kono et al. | |
| 2009/0258296 A1 | 10/2009 | Kawasato et al. | |
| 2009/0268377 A1 | 10/2009 | Choi et al. | |
| 2009/0317718 A1 | 12/2009 | Imachi et al. | |
| 2010/0009258 A1 | 1/2010 | Hasegawa et al. | |
| 2010/0047690 A1 | 2/2010 | Tsuchiya et al. | |
| 2010/0075229 A1 | 3/2010 | Atsuki et al. | |
| 2010/0112441 A1 | 5/2010 | Fukumine et al. | |
| 2010/0117031 A1 | 5/2010 | Akagi et al. | |
| 2010/0136430 A1 | 6/2010 | Lee | |
| 2010/0140554 A1 | 6/2010 | Oki et al. | |
| 2010/0143799 A1 | 6/2010 | Park | |
| 2011/0009553 A1 * | 1/2011 | Heller et al. | 524/503 |
| 2011/0045168 A1 | 2/2011 | Seo et al. | |

FOREIGN PATENT DOCUMENTS

| | | |
|---|---|---|
| EP | 1172878 A2 | 1/2002 |
| JP | 62270337 A | 11/1987 |
| JP | 8069791 | 3/1996 |
| JP | 10208729 A | 8/1998 |
| JP | 11149929 A | 6/1999 |
| JP | 2002226505 A | 8/2002 |
| JP | 2004185826 A | 7/2004 |
| WO | 2007142579 A1 | 12/2007 |

* cited by examiner

LARGE FORMAT ULTRACAPACITORS AND METHOD OF ASSEMBLY

BACKGROUND OF THE INVENTION

Commonly used binders in the fabrication of commercial ultracapacitor electrodes include polyvinyledene fluoride (PVDF), ethylene-propylene, diene (EPDM), as well as other materials. The binders consist of one or more polymers, which are generally insoluble in water. Hence, organic solvent such as N-methyl pyrrolidone (NMP) is being used to dissolve these binders to fabricate electrodes. Some disadvantages of using organic solvents are that they are relatively higher in cost, they can possess negative environmental impacts, and pose disposal issues. Further, PVDF is highly unstable and tends to break down at high temperatures.

Accordingly, there is a need for water soluble binders to fabricate electrodes for ultracapacitors.

SUMMARY OF THE INVENTION

Briefly, the present invention provides a capacitor comprising a plurality of electrode substrates, with each of the plurality of electrode substrates having a coated portion and an uncoated portion. The coated portion is an electrode material comprised of activated carbon material with high surface area, a water soluble binder selected from the group consisting of: poly vinyl alcohol, poly acrylic acid, polymethacrylic acid, polyethylene oxide, polyacrylamide, poly-N-isopropylearylamide, poly-N,N-dimethylacrylamide, polyethyleneimine, polyoxyethylene, polyvinylsulfonic acid, poly(2-methoxyethoxyethoxyethylene), butadiene-acrylonitrile, and combinations thereof, and a water soluble thickener. A separator is inserted between adjacent substrates of the plurality of electrode substrates. The capacitor further includes an electrolyte.

The present invention also provides a method of manufacturing a large format capacitor. The method comprises the steps of forming a slurry that contains activated carbon material with high surface area, a water soluble binder selected from the group consisting of: poly vinyl alcohol, poly acrylic acid, polymethacrylic acid, polyethylene oxide, polyacrylamide, poly-N-isopropylearylamide, poly-N,N-dimethylacrylamide, polyethyleneimine, polyoxyethylene, polyvinylsulfonic acid, poly(2-methoxyethoxyethoxyethylene), butadiene-acrylonitrile, and combinations thereof, a water soluble thickener (if necessary) and water; coating a substrate with the slurry; and drying the coating onto the substrate.

BRIEF DESCRIPTION OF THE DRAWINGS

The foregoing summary, as well as the following detailed description of the invention, will be better understood when read in conjunction with the appended drawings. For the purpose of illustrating the invention, certain embodiments of the present invention are shown in the drawings. It should be understood, however, that the invention is not limited to the precise arrangements shown. The present invention will hereinafter be described in conjunction with the appended drawing figures wherein like numerals denote like elements. In the drawings.

DETAILED DESCRIPTION OF EXEMPLARY EMBODIMENTS

Figure 1:
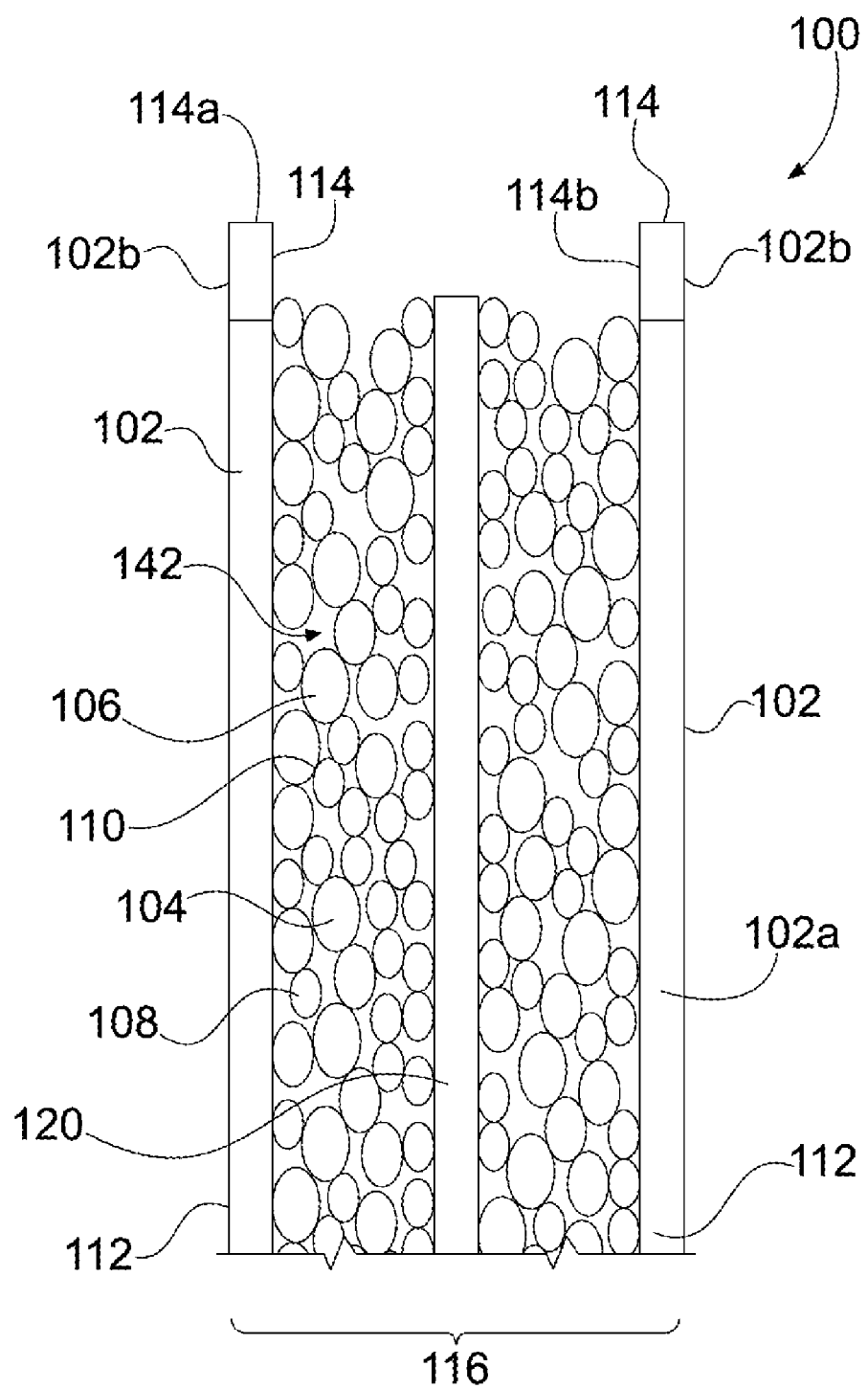
FIG. 1 is a schematic view of a capacitor according to an exemplary embodiment of the present invention.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It is understood that various changes may be made in the function and arrangement of elements without departing from the spirit and scope of the invention, as set forth in the appended claims.

To aid in describing the invention, directional terms are used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features. Generally, the following disclosure refers to electrodes for ultracapacitors using water soluble binders and a method of manufacturing large size ultracapacitors using the above electrodes.

Referring to FIG. 1, an ultracapacitor 100 according to an exemplary embodiment of the present invention is shown. Ultracapacitor 100 includes a plurality of metallic electrode substrates 102. Each of the plurality of electrode substrates 102 has a coated portion 102a and an uncoated portion 102b. Substrate 102 is coated with a coating material 104, forming coated portion 102a. Substrate 102 may be aluminum, carbon coated aluminum foil, and any polymer primed aluminum foil (with or without carbon) or any other suitable material.

Coating 104 includes an activated carbon material with high surface area 106 mixed with a water soluble binder 108 and water to form a slurry. A water soluble thickener 110 may be added to the slurry to thicken the slurry for application onto electrode substrates 102. Additionally, a conductive additive or additives selected from the group consisting of carbon black, acetylene black, carbon fibers, coke, high surface area carbon and graphite may optionally be added to the slurry.

Exemplary high surface area activated carbon material 106 may be activated carbon, activated carbon nano foam, or other suitable carbon-based material. The amount of carbon in the slurry ranges between about 60 and about 95 weight percent. An exemplary surface area of activated carbon material 106 may be between about 100 to be about 2500 square meters per gram ($m^2/g$).

Exemplary water soluble binder 108 may be selected from the group consisting of: poly vinyl alcohol, poly acrylic acid, polymethacrylic acid, polyethylene oxide, polyacrylamide, poly-N-isopropylacrylamide, poly-N,N-dimethylacrylamide, polyethyleneimine, polyoxyethylene, polyvinylsulfonic acid, poly(2-methoxyethoxyethoxyethylene), butadiene-acrylonitrile, carboxymethylcellulose, (CMC), polyvinylpyrrolidone, poly(allylamine), xanthan gum, guar gum, chitosan, polyvinyl acetate, gelatin, casein, styrene butadiene rubber (SBR), butadiene-acrylonitrile, rubber (NBR) hydrogenated NBR (HNBR), epichlorhydrin rubber (CHR), acrylate rubber (ACM), a cellulose from the group consisting of natural cellulose, physically and for chemically modified cellulose, natural polysaccharides, chemically and for physically modified polysaccharides, hydroxy methyl cellulose and methyl ethyl hydroxy cellulose, poly(carboxylic acid) and combinations and/or copolymers thereof.

Exemplary poly(carboxylic acids) are: polylactic acid (PLA), polyacrylic acid, polysuccinic acid, poly maleic acid and anhydride, poly furoic (pyromucic acid), poly fumaric acid, poly sorbic acid, poly linoleic acid, poly linolenic acid, poly glutamic acid, poly methacrylic acid, poly licanic acid, poly glycolic acid, poly aspartic acid, poly amic acid, poly formic acid, poly acetic acid, poly propoionic acid, poly butyric acid, poly sebacic acid, and copolymers thereof. When using poly(carboxylic acids), the pH of binder 108 can be neutralized by adding LiOH or other suitable material. The weight percent of binder in the slurry ranges between about 1 and about 20 percent.

Exemplary water soluble thickener 110 may be selected from the group consisting of natural cellulose, physically and/or chemically modified cellulose, natural polysaccharides, chemically and/or physically modified polysaccharides, carboxymethyl cellulose, hydroxy methyl cellulose and methyl ethyl hydroxy cellulose. The total solid weight percent of the thickener in the slurry ranges between about 1 and about 5 weight percent such that the weight percentage of the carbon, the binder, the thickener, and the conductive additive equals 100 percent. Water is added to the solid components to form the slurry such that the weight percent of the water in the slurry ranges between about 20 and about 70 percent.

The slurry is coated onto coated portion 102a of electrode substrates 102 and dried until the moisture level is less than 1000 parts per million (ppm) or more preferably less than 200 ppm in the electrode 102a. After drying, electrode substrates 102 are cut into desired size and shaped electrodes 112, with uncoated portion 102b formed into terminal tabs 114. Electrodes 112 are stacked on top of each other, with a separator 120 inserted between adjacent electrodes 112, forming an electrode stack 116. Separator 120 may be a micro porous material such as, for example polyethylene or polypropylene-type separator or plasticized polymer type separators which are bonded to the electrodes. Separator 120 extends beyond coating 102a as shown in FIG. 1 to prevent direct contact between adjacent electrodes 102.

Terminal tabs 114 are alternated on different sides of adjacent electrodes 112, with terminal tabs 114a on one side of ultracapacitor 100 being "positive" terminal tabs 114a and terminal tabs 114b on the other side of ultracapacitor 100 being "negative" terminal tabs 114b. Terminal tabs 114a and 114b both extend from the same side (i.e., top) of ultracapacitor 100, resulting in less complexity in connecting terminal tabs 114 to an electrical circuit than having one set of terminal tabs extending from the top of ultracapacitor 100 and the other terminal tabs extending from the bottom of ultracapacitor 100.

An equal number of positive terminal tabs 114a as negative terminal tabs 114b are provided, with positive terminal tabs 114a coupled to each other in parallel and negative terminal tabs 114b coupled to each other in parallel as well to form a capacitive circuit, or bundle. Ultracapacitor 100 may include multiple bundles, with the multiple bundles coupled together in series to achieve a desired capacitor voltage.

Figure 2:
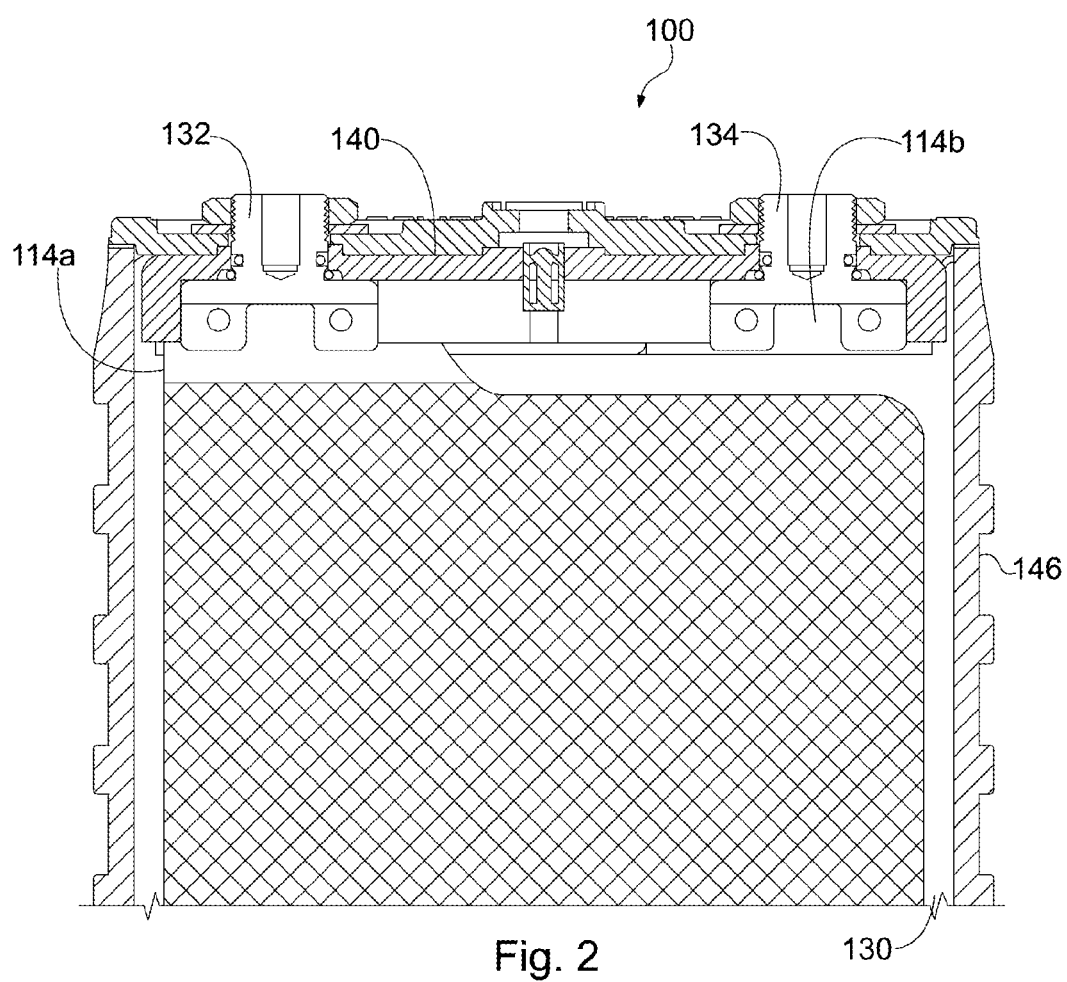
FIG. 2 is a sectional view of an exemplary capacitor configuration according to an exemplary embodiment of the present invention.

Referring to FIG. 2, the bundles are enclosed in packaging that includes a pressure regulated large format cell pouch 130. Cell pouch 130 includes a metallic lamination, with the inside of pouch 130 being formed from a heat sealable material, such as, for example, an aluminum pouch bag material supplied by Showa Denko, Japan.

Positive terminal tabs 114a are coupled to a positive terminal 132 inside cell pouch 130 and negative terminal tabs 114b are coupled to a negative terminal 134, also inside cell pouch 130. The feature of providing these couplings inside cell pouch 130 provides improved safety and eliminates hazards during handling of ultracapacitor 100.

An insulator block 140 provides structure and a pass-through for terminals 132, 134 in a hermetic fashion. Insulator block 140 provides for sealing of cell pouch 130 to seal around the pass-throughs for terminals 132, 134. An exemplary packaging is disclosed in U.S. patent application Ser. No. 12/729,790, which is owned by the assignee of the present invention and is incorporated herein by reference in its entirety as though fully set forth.

Referring back to FIG. 1, ultracapacitor 100 further includes an electrolyte 142 that is inserted into cell pouch 130. The electrolyte 142 may be an aqueous or a non-aqueous medium with an appropriate salt. An exemplary organic electrolyte may be tetraethylammonium tetrafluoroborate (TEABF$_4$) in acetonitrile (ACN) or propylene carbonate (PC).

Cell pouch 130 may be stored in a housing assembly 146. An exemplary housing assembly 146 is a nested heatsink housing assembly disclosed in U.S. patent application Ser. No. 12/730,642, which is owned by the assignee of the present invention and is incorporated herein by reference in its entirety as though fully set forth. The ultracapacitor 100 according to the present invention has a capacity of between about 30 and about 40 Farads.

Figure 3:
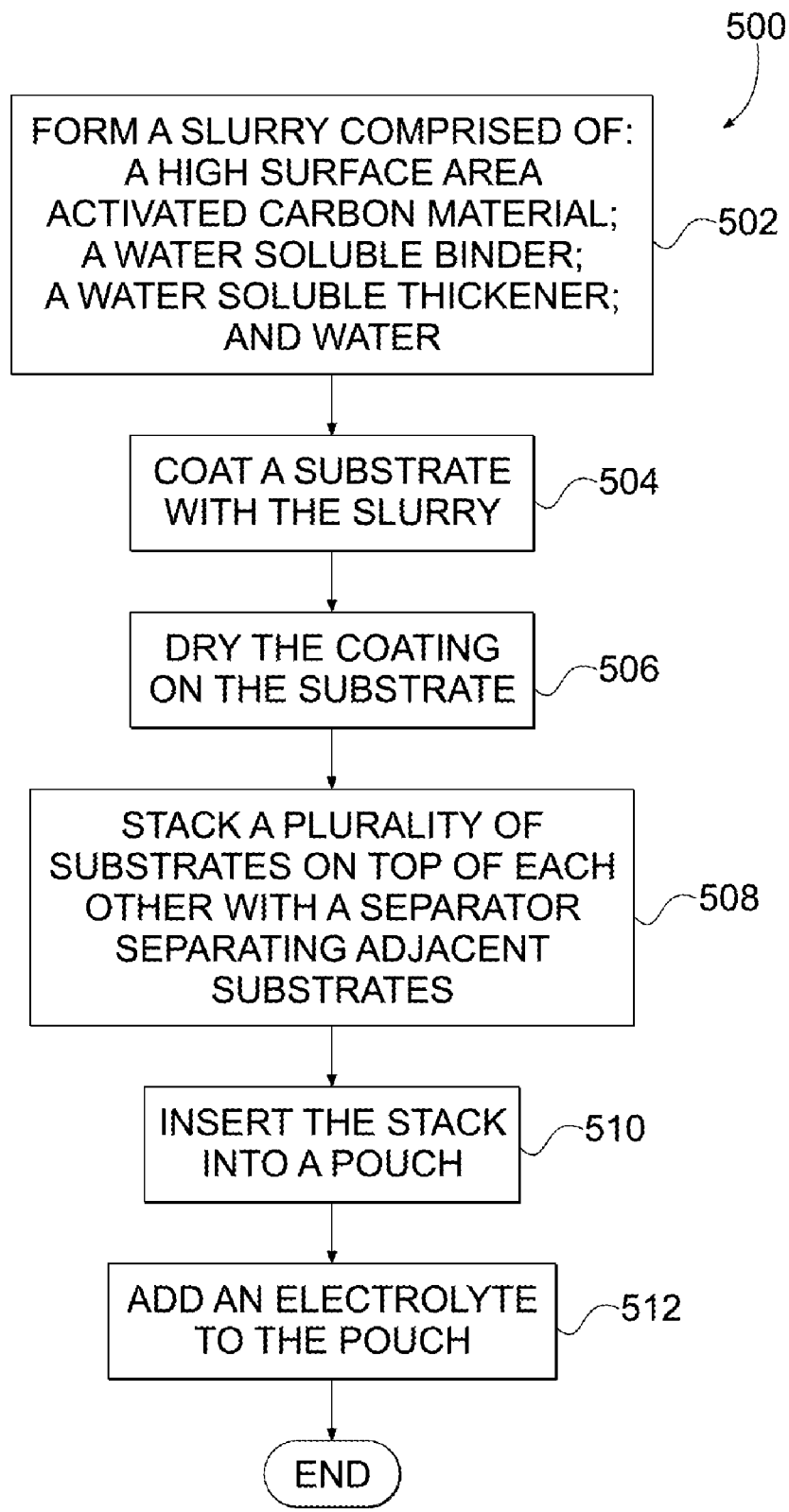
FIG. 3 is a flowchart of exemplary steps performed to manufacture the capacitor of FIGS. 1 and 2.

Referring to the flowchart 500 of FIG. 3, an exemplary method of manufacturing ultracapacitor 100 is provided. In step 502, a slurry is formed comprised of high surface area activated carbon material 106, water soluble binder 108, water soluble thickener 110, and water. In step 504, substrate 114 is coated with the slurry and in step 506, the coating is dried onto the substrate 114.

In step 508, a plurality of the substrates 114 are stacked on top of each other, while separating adjacent substrates from each other with micro porous separator material 120, forming a stack. In step 510, the stack is inserted into cell pouch 130 and in step 512, electrolyte 142 is added to the stack in cell pouch 130.

While the principles of the invention have been described above in connection with preferred embodiments, it is to be clearly understood that this description is made only by way of example and not as a limitation of the scope of the invention.

The invention claimed is:

1. A capacitor comprising:
   a plurality of electrode substrates, each of the plurality of electrode substrates having a coated portion and an uncoated portion, the coated portion being coated with a coating material comprising:
      an activated carbon material with high surface area;
      a water soluble binder selected from the group consisting of poly vinyl alcohol, poly acrylic acid, polymethacrylic acid, polyethylene oxide, polyacrylamide, poly-N-isopropylearylamide, poly-N,N-dimethylacrylamide, polyethyleneimine, polyoxyethylene, polyvinylsulfonic acid, poly(2-methoxyethoxyethoxyethylene), butadiene-acrylonitrile, and combinations thereof; and
      a water soluble thickener;
   a separator inserted between adjacent substrates of the plurality of electrode substrates; and
   an electrolyte.

2. The capacitor according to claim 1, wherein the water soluble binder comprises poly acrylic acid.

3. The capacitor according to claim 1, wherein the water soluble binder comprises polymethacrylic acid.

4. The capacitor according to claim 1, wherein the water soluble binder comprises polyethylene oxide.

5. The capacitor according to claim 1, wherein the water soluble binder comprises polyacrylamide.

6. The capacitor according to claim 1, wherein the water soluble binder comprises poly-N-isopropylearylamide.

7. The capacitor according to claim 1, wherein the water soluble binder comprises poly-N,N-dimethylacrylamide.

8. The capacitor according to claim 1, wherein the water soluble binder comprises polyethyleneimine.

9. The capacitor according to claim 1, wherein the water soluble binder comprises polyoxyethylene.

10. The capacitor according to claim 1, wherein the water soluble binder comprises polyvinylsulfonic acid.

11. The capacitor according to claim 1, wherein the water soluble binder comprises poly(2-methoxyethoxyethoxyethylene).

12. The capacitor according to claim 1, wherein the water soluble binder comprises butadiene-acrylonitrile.

13. The capacitor according to claim 1, wherein the activated carbon material comprises activated carbon nano foam.

14. The capacitor according to claim 1, wherein the activated carbon material has a surface area between about 100 square meters per gram and about 2,500 square meters per gram.

15. The capacitor according to claim 1, having a capacitance of above about 30 Farads.

16. The capacitor according to claim 1, wherein the electrolyte comprises an aqueous medium.

17. The capacitor according to claim 1, wherein the electrolyte comprises a non-aqueous medium.

18. The capacitor according to claim 1, wherein the coating further comprises a conductive additive.

19. A method comprising the steps of:
   a) forming a slurry comprised of:
      a high surface area activated carbon material;
      a water soluble binder selected from the group consisting of: poly vinyl alcohol, poly acrylic acid, polymethacrylic acid, polyethylene oxide, polyacrylamide, poly-N-isopropylearylamide, poly-N,N-dimethylacrylamide, polyethyleneimine, polyoxyethylene, polyvinylsulfonic acid, poly(2-methoxyethoxyethoxyethylene), butadiene-acrylonitrile, and combinations thereof;
      a water soluble thickener; and
      water;
   b) coating a substrate with the slurry; and
   c) drying the coating onto the substrate.

20. The method according to claim 19, further comprising the steps of:
   d) stacking a plurality of the substrates on top of each other, while separating adjacent substrates from each other with a micro porous separator material;
   e) inserting the stack into a pouch; and
   f) adding an electrolyte to the stack in the pouch.

* * * * *